United States Patent
Liu et al.

(10) Patent No.: US 11,520,567 B2
(45) Date of Patent: Dec. 6, 2022

(54) CODE REUSE PROCESSING METHOD, APPARATUS AND ELECTRONIC DEVICE

(71) Applicant: Beijing Baidu Netcom Science and Technology Co., Ltd., Beijing (CN)

(72) Inventors: Zhiwei Liu, Beijing (CN); Zhan Shi, Beijing (CN); Wei Bai, Beijing (CN); Tao Li, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 17/204,087

(22) Filed: Mar. 17, 2021

(65) Prior Publication Data

US 2021/0200518 A1  Jul. 1, 2021

(30) Foreign Application Priority Data

May 7, 2020 (CN) .......................... 202010379625.9

(51) Int. Cl.
*G06F 8/36* (2018.01)

(52) U.S. Cl.
CPC ..................... *G06F 8/36* (2013.01)

(58) Field of Classification Search
None
See application file for complete search history.

(56) References Cited

U.S. PATENT DOCUMENTS

| | | | | |
|---|---|---|---|---|
| 8,230,392 B2* | 7/2012 | Joss | ........................... | G06F 8/36 717/127 |
| 8,479,145 B2* | 7/2013 | Swaminathan | ........... | G06F 8/36 717/100 |
| 9,268,805 B2* | 2/2016 | Crossley | ............... | G06F 16/219 |
| 2005/0120333 A1* | 6/2005 | Inoue | ........................ | G06F 8/36 717/101 |

(Continued)

FOREIGN PATENT DOCUMENTS

| CN | 109840086 A | 6/2019 |
|---|---|---|
| CN | 110083749 A | 8/2019 |

(Continued)

OTHER PUBLICATIONS

Flakes, "Software Reuse: Metrics and Models", 1996, ACM (Year: 1996).*

(Continued)

*Primary Examiner* — Hossain M Morshed
(74) *Attorney, Agent, or Firm* — Quinn IP Law (57) ABSTRACT

A code reuse processing method, apparatus and electronic device related to a software development technology in the technical field of computers. The method includes: receiving a target request sent by a client of a target unit; in response to the target request, determining a first code line quantity per capita submitted within a target unit time and a reuse
(Continued)

code base of the target unit used by a first code base in a dependency manner, the first code base is a code base except the reuse code base; determining reference information configured to indicate an amount of labor capable of being saved for the target unit when the target unit performs a code reuse within a target duration, the reference information based on the first code line quantity, a code line quantity of the reuse code base and a preset reuse proportion; and outputting the reference information to the client.

14 Claims, 3 Drawing Sheets

(56) References Cited

U.S. PATENT DOCUMENTS

| | | | |
|---|---|---|---|
| 2010/0058284 A1* | 3/2010 | Swaminathan | G06F 8/36 717/101 |
| 2012/0131540 A1* | 5/2012 | Mendis | G06F 8/77 717/101 |

FOREIGN PATENT DOCUMENTS

| | | |
|---|---|---|
| CN | 110554868 A | 12/2019 |
| JP | 2004206586 A | 7/2004 |
| JP | 2010026669 A | 2/2010 |

OTHER PUBLICATIONS

Poulin, "A Reuse Metrics and Return on Investment Model", 1993, IEEE (Year: 1993).*
Devanbu, "Analytical and Empirical Evaluation of Software Reuse Metrics", 1996, IEEE (Year: 1996).*
Imoize, "A Brief Overview of Software Reuse and Metrics in Software Engineering", 2019, World Scientific News (Year: 2019).*
Ram, "Design Specification", 2019, International Research Journal of Engineering and Technology (IRJET) (Year: 2019).*
Poulin, "Measuring Reuse", 1992, IBM (Year: 1992).*
Frakes, "Software Reuse: Metrics and Models", 1996, ACM Computing (Year: 1996).*
Japanese Office Action for Japanese Patent Application No. 2021-042468, dated Jan. 13, 2022.

* cited by examiner

CODE REUSE PROCESSING METHOD, APPARATUS AND ELECTRONIC DEVICE

CROSS REFERENCE OF RELATED APPLICATION

This application claims a priority to Chinese Patent Application No. 202010379625.9 filed on May 7, 2020, the disclosures of which are incorporated in their entirety by reference herein.

TECHNICAL FIELD

The present disclosure relates to software development technologies in the field of computer technologies, and in particular, to a code reuse processing method, an apparatus and electronic device.

BACKGROUND

The code is a source file written by a programmer by a language supported by a development tool, which is a group of definite rule systems for expressing information in a discrete form by characters, symbols or signal code elements, and the functions of electronic device such as a terminal, a desktop computer and the like need to be realized by the codes. The code reuse is an important code writing means for software development, which can reduce the repeated workload of programmers and improve the software development efficiency. However, at present, many individuals or enterprises and public institutions do not realize the benefits brought by code reuse and do not adopt code reuse, which is not beneficial to a popularization of code reuse, so that a popularization rate of code reuse is low.

SUMMARY

A code reuse processing method, an apparatus and electronic device are provided, to solve the issue that a popularization rate of code reuse is low.

In a first aspect, a code reuse processing method is provided, which applied to an electronic device and includes:

receiving a target request sent by a client of a target unit;

in response to the target request, determining a first code line quantity and a reuse code base of the target unit, where the first code line quantity is a code line quantity per capita submitted within a target unit time, the reuse code base is a code base used by a first code base in a dependency manner, and the first code base is a code base except the reuse code base;

determining reference information, based on the first code line quantity, a code line quantity of the reuse code base and a preset reuse proportion, where the reference information is configured to indicate an amount of labor capable of being saved for the target unit when the target unit performs a code reuse within a target duration; and outputting the reference information to the client.

In a second aspect, a code reuse processing apparatus is further provided, which is applied to an electronic device and includes:

a request receiving module, configured to receive a target request sent by a client of a target unit;

a first determining module, configured to determine, in response to the target request, a first code line quantity and a reuse code base of the target unit, where the first code line quantity is a code line quantity per capita submitted within a target unit time, the reuse code base is a code base used by a first code base in a dependency manner, and the first code base is a code base except the reuse code base;

a second determining module, configured to determine reference information, based on the first code line quantity, a code line quantity of the reuse code base and a preset reuse proportion, where the reference information is configured to indicate an amount of labor capable of being saved for the target unit when the target unit performs a code reuse within a target duration; and an outputting module, configured to output the reference information to the client.

In a third aspect, an electronic device is further provided, including:

at least one processor; and a memory communicatively coupled to the at least one processor; where the memory stores instructions executable by the at least one processor, and the instructions are executed by the at least one processor to enable the at least one processor to perform the method in the first aspect.

In a fourth aspect, a non-transitory computer readable storage medium storing computer instructions is further provided, where the computer instructions are configured to enable a computer to perform the method in the first aspect.

According to the present disclosure, a target request sent by a client of a target unit is received; in response to the target request, a first code line quantity and a reuse code base of the target unit is determined, where the first code line quantity is a code line quantity per capita submitted within a target unit time, the reuse code base is a code base used by a first code base in a dependency manner, and the first code base is a code base except the reuse code base; reference information is determined based on the first code line quantity, a code line quantity of the reuse code base and a preset reuse proportion, where the reference information is configured to indicate an amount of labor capable of being saved for the target unit when the target unit performs a code reuse within a target duration; and the reference information is output to the client. Therefore, the electronic device determines the labor which can be saved when the target unit performs a code reuse within the target duration, reference is provided visually for a popularization of code reuse of the target unit, and the popularization rate of code reuse is improved.

It should be understood that the statements in this section are not intended to identify key or critical features of the embodiments of the present disclosure, nor are they intended to limit the scope of the present disclosure. Other features of the present disclosure will become apparent from the following description.

BRIEF DESCRIPTION OF THE DRAWINGS

The drawings are included to provide a better understanding of the present solution and are not to be considered limiting of the present disclosure. Wherein.

DETAILED DESCRIPTION

The following description of the exemplary embodiments of the present disclosure, taken in conjunction with the accompanying drawings, includes various details of the embodiments of the application to assist in understanding, which are to be considered exemplary only. Accordingly, those of ordinary skill in the art will recognize that various changes and modifications of the embodiments described herein can be made without departing from the scope and spirit of the present disclosure. In addition, descriptions of well-known functions and constructions are omitted in the following description for clarity and conciseness.

Figure 1:
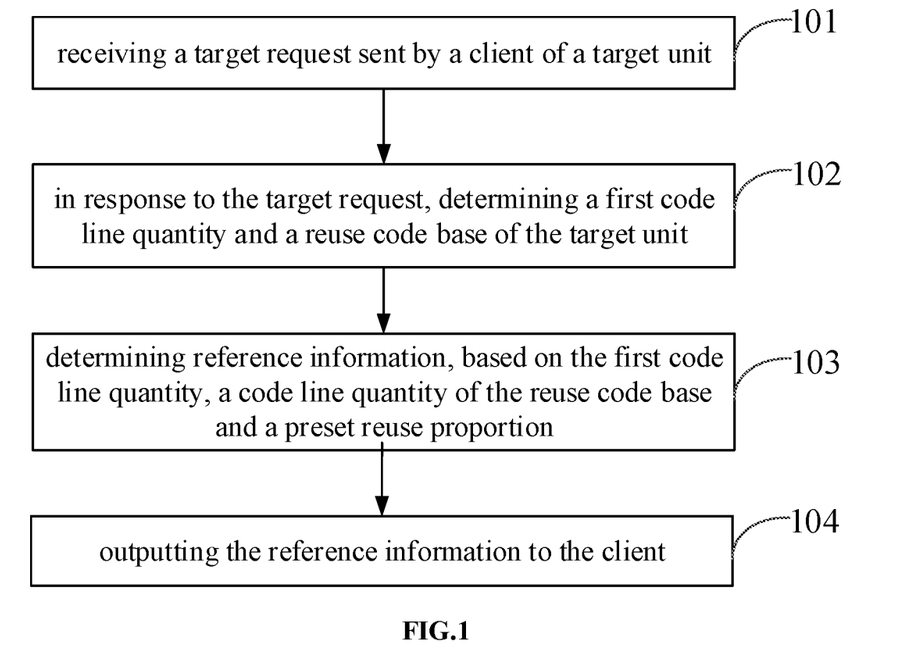
FIG. 1 is a first schematic view according to a first embodiment of the present disclosure.

Referring to FIG. 1, a code reuse processing method provided in an embodiment of the present disclosure may be applied to an electronic device, and as shown in FIG. 1, the code reuse processing method includes the following steps:

Step 101: receiving a target request sent by a client of a target unit.

In the present disclosure, in the case that the target unit needs to know the amount of labor which can be saved for the target unit when the target unit performs the code reuse within the target duration, an operation instructing the client to send a target request to the electronic device may be input at the client, and the client sends the target request to the electronic device in response to the operation.

The target unit may be a unit including at least one code writing person, e.g. the target unit may be an enterprise or the like.

In addition, the target request is used for instructing the electronic device to provide reference information for indicating the amount of labor which can be saved for the target unit due to the code reuse of the target unit.

Step 102: in response to the target request, determining a first code line quantity and a reuse code base of the target unit.

The first code line quantity is a code line quantity per capita submitted within a target unit time, the reuse code base is a code base used by a first code base in a dependency manner, and the first code base is a code base except the reuse code base.

In the present disclosure, after receiving the target request, the electronic device may obtain, in response to the target request, the code line quantity per capita submitted within the target unit time by the target unit, and obtain the reuse code base of the target unit.

The above-mentioned acquiring the first code line quantity may be: an electronic device acquires a code line quantity which is finished and submitted by the target unit and a quantity of people submitting the codes within a certain duration, and calculates the first code line quantity based on a length of the duration, the submitted code line quantity and the quantity of people submitting the codes.

For example, if the target unit time is one day, if the electronic device acquires that a quantity of code lines submitted by 20 engineers in a company within 50 days is 20000 lines according to the submission record of the code submission tool Git of the company client, the first code line quantity is 200 lines, that is, the code line quantity per capita per day of the company=20000/(50×20)=200 lines.

Alternatively, the acquiring the first code line quantity may be: the electronic device acquires code line quantities which are submitted and a quantity of people submitting the codes within a plurality of target unit durations, to acquire the code line quantity per capita within the target unit durations, and determines an average of the code line quantity per capita within the target unit durations as the first code line quantity.

For example, if the target unit time is every day, if the electronic device determines that the code line quantity per capita submitted by the enterprise for 5 consecutive days is 300, 250, 200, 300, and 200 respectively, then the first code line quantity Cd=(300+250+200+300+200)/5=250 lines, and so on.

In the present disclosure, the determining the reuse code base of the target unit may be: the electronic device determines, from the code base of the enterprise, one code base for storing the submitted codes as a reuse code base, where the reuse code base is a code base which is used by another code base (i.e., the first code base) in a dependency manner, that is, part or all of the codes in the reuse code base are reused by another code base.

The first code base may be a code base of the target unit or a code base of a unit other than the target unit, the first code base uses the reuse code base in a dependency manner, and for example, if a Java code base of an enterprise is a code base managed by maven and the like in a dependency manner, the electronic device may determine that the Java code base is the reuse code base.

It should be noted that, in a case that the target unit has a plurality of code bases being used in a dependency manner, the electronic device may determine one code base from the plurality of code bases being used in a dependency manner as the reuse code base according to a preset rule, for example, the electronic device may randomly select one code base being used in a dependency manner as the reuse code base.

In some embodiments, a number of times of using the reuse code base by the first code base in a dependency manner is greater than or equal to a preset number of times, so that the condition for selecting the reuse code base is strict, thereby the reference value for providing the labor which can be saved by the target unit by performing the code reuse may be more indicative.

For example, assuming that the preset number of times is 3, if the enterprise's code base A1 is used by code bases B1, C1 and D1 in a dependency manner (i.e., the number of times that A1 is used in a dependency manner is 3), and the code base A2 is used by code bases B2 and D2 in a dependency manner (i.e., the number of times that A2 is used in a dependency manner is 2), the electronic device determines the code base A1 as the reuse code base, and so on.

Step 103: determining reference information, based on the first code line quantity, a code line quantity of the reuse code base and a preset reuse proportion.

The reference information is configured to indicate an amount of labor which can be saved for the target unit when the target unit performs a code reuse within a target duration.

In the present disclosure, after the electronic device acquires the first code line quantity and determines the reuse code base, the electronic device may determine, based on the first code line quantity, the code line quantity of the reuse code base, and a preset reuse proportion, reference information configured to indicate an amount of labor capable of being saved for the target unit when the target unit performs a code reuse within a target duration.

Since not every code line in the reuse code base is reused, the preset reuse proportion may be set to represent a proportion of the reused codes in the reuse code base, and the preset reuse proportion may be a constant value obtained empirically, for example, the preset reuse proportion may be set to 0.2 by referring to the Pareto principle (i.e. 80% of consequences come from 20% of the causes).

In addition, the code line quantity of the reuse code base may be an actual code line quantity of the reuse code base, and the target duration may be a duration in units of the above target time unit.

For example, the reference information may be a ratio between a product of the actual code line quantity of the reuse code base and the preset reuse proportion and a product of the first code line quantity and the target time duration.

In some embodiments, the Step 103 may include:

acquiring a maximal code line quantity and an actual code line quantity of the reuse code base, where the maximal code line quantity is determined based on the first code line quantity, a quantity of people submitting codes and a quantity of code submitting times; and determining the reference information based on the first code line quantity, the maximal code line quantity, the actual code line quantity and the preset reuse proportion.

Here, the electronic device determines the reference information based on the first code line quantity, the maximal code line quantity, the actual code line quantity and a preset reuse proportion, so that the determined reference information is more accurate and indicative.

In this embodiment, since the codes in the reuse code base usually include not only the codes written by the code writer but also the codes automatically generated by the tool, the maximal code line quantity may be set to indicate the number of lines of the codes actually written by the code writer in the reuse code base, and the maximal code line quantity is determined based on the first code line quantity, the quantity of persons who has submitted the codes, and the number of code submitting times.

The quantity of persons who has submitted the codes and the number of the code submitting times may be the quantity of people who submits the codes to the reuse code base and the number of code submitting times within a certain duration determined by the electronic device according to the record of the code submitting tool of the target unit.

In addition, the electronic device may determine the maximal code line quantity based on the first code line quantity, the quantity of people who submits the codes and the number of code submitting times, and may use a product of the first code line quantity, the quantity of people who submits the codes and the number of code submitting times as the maximal code line quantity, that is, the maximal code line quantity=the first code line quantity×the quantity of people who submits the codes×the number of code submitting times.

For example, when the electronic device acquires that the quantity of people who submits the codes since the reuse code base is established was 5 and the number of code submitting times was 50, if the first code line quantity is 200, the maximal code line quantity of the reuse code base is 50000.

It should be noted that the number of code submitting times may be an acquired actual number of code submitting times of the reuse code base, for example, if 2 coding person submit codes to the reuse code base for a total of 8 times in three consecutive days (for example, one person submits the codes for one time every day; the other person submits the codes for one time on a certain day, and submits the codes for two times on each of other two days), the number of code submitting times is determined to be 10 times.

Alternatively, in some embodiments, in a case that the number of times of submitting the codes to the reuse code base within the unit time by the target person is multiple, the number of times of submitting the codes by the target person is one.

Here, since the code writer may repeatedly submit the codes to the reuse code base a plurality of times per unit time, and the electronic device assumes that the target person submits the codes only once, the determined reference information can be further made more accurate and indicative.

For example, if 2 Coding persons submit the codes to the reuse code base for 8 times in total for three consecutive days (e.g., one person submits the codes for one time every day; the other person submits the codes for one time on a certain day, and submits the codes for two times on each of other two days), the electronic device determines that both of the two coding persons submit the codes for one time every day, and the number of code submitting times is 6 times.

In addition, the determining the reference information based on the first code line quantity, the maximal code line quantity, the actual code line quantity and the preset reuse proportion may be performed based on the first code line quantity, the maximal code line quantity, the actual code line quantity and the preset reuse proportion based on a preset rule. For example, the average of the maximal code line quantity and the actual code line quantity may be determined as the code line quantity of the reuse code base in Step 103, and so on.

In some embodiments, the determining the reference information based on the first code line quantity, the maximal code line quantity, the actual code line quantity and the preset reuse proportion includes:

determining the reference information based on the first code line quantity, the maximal code line quantity and the preset reuse proportion, in a case that the actual code line quantity is greater than or equal to the maximal code line quantity.

Alternatively, in another embodiment, the determining the reference information based on the first code line quantity, the maximal code line quantity, the actual code line quantity and the preset reuse proportion includes:

determining the reference information based on the first code line quantity, the actual code line quantity and the preset reuse proportion, in a case that the actual code line quantity is less than the maximal code line quantity.

Here, the electronic device may, based on the comparison result between the maximal code line quantity and the actual code line quantity in the code base, use the maximal code line quantity or the actual code line quantity to determine the reference information, so that the determination manner of the reference information is flexible and accurate.

Specifically, assuming that the target unit time is day, the electronic device may determine the reference information according to the following formula (1):

$$H = \frac{\lambda \cdot C_r}{C_d \cdot D} \tag{1}$$

wherein H represents the above reference information;

$\lambda$ represents the preset reuse proportion;

$C_r$ represents the code line quantity of the reuse code base, namely when the actual code line quantity of the reuse code base is greater than or equal to the maximal code line quantity, $C_r$ is the maximal code line quantity; and when the actual code line quantity of the reuse code base is less than the maximal code line quantity, Cr is the actual code line quantity.

$C_d$ represents the code line quantity per capita per day of an enterprise;

D represents the number of days (i.e., the target duration), e.g., if the labor saved for the enterprise for 1 year is to be calculated, D is 365, and so on.

In some embodiments, prior to the determining the reference information based on the first code line quantity and the code line quantity of the reuse code base, the method further includes:

acquiring a number of times of using the reuse code base in a dependency manner;

the determining the reference information based on the first code line quantity, the code line quantity of the reuse code base and the preset reuse proportion includes:

determining the reference information, based on the first code line quantity, the code line quantity of the reuse code base, the number of times of using the reuse code base in a dependency manner and the preset reuse proportion.

Here, the number of times the reuse code base is used in a dependency manner is considered in the process of determining the reference information, so that the determined reference information can be more accurate and indicative.

Specifically, assuming that the target unit time is day, the electronic device may determine the reference information according to the following formula (2):

$$H = \frac{\lambda \cdot \Delta E \cdot C_r}{C_d \cdot D} \quad (2)$$

where $\Delta E$ represents the number of times the above-mentioned reuse code base is used in a dependency manner.

For example, assuming that the above-mentioned reuse codebase A has 10 ten thousand lines of code (i.e. the actual code line quantity), the maximal code line quantity is 5 ten thousand lines, and the constant $\lambda$ (i.e. the preset reuse proportion) is 0.2, the engineer's daily code line quantity per-capita is 200 lines, the 1-year development day is 365 days (i.e. the target duration D), and the number of times the reuse codebase A is used in a dependency manner is 2, the amount of labor (i.e. the number of people) saved for the enterprise per year is:

$$H = \frac{0.2 \cdot 2 \cdot 50000}{200 \cdot 365} = 0.27 \text{ (per capita/per year)}$$

that is, assuming a human cost per engineer per year is 100 million RMB, 0.27×100 million=27 million RMB per year of the human cost can be saved through code reuse.

According to the present disclosure, a target request sent by a client of a target unit is received; in response to the target request, a first code line quantity and a reuse code base of the target unit is determined, where the first code line quantity is a code line quantity per capita submitted within a target unit time, the reuse code base is a code base used by a first code base in a dependency manner, and the first code base is a code base except the reuse code base; reference information is determined based on the first code line quantity, a code line quantity of the reuse code base and a preset reuse proportion, where the reference information is configured to indicate an amount of labor capable of being saved for the target unit when the target unit performs a code reuse within a target duration; and the reference information is output to the client in Step 104. Therefore, the electronic device determines the labor which can be saved when the target unit performs a code reuse within the target duration, reference is provided visually for a popularization of code reuse of the target unit, and the popularization rate of code reuse is improved.

Figure 2:
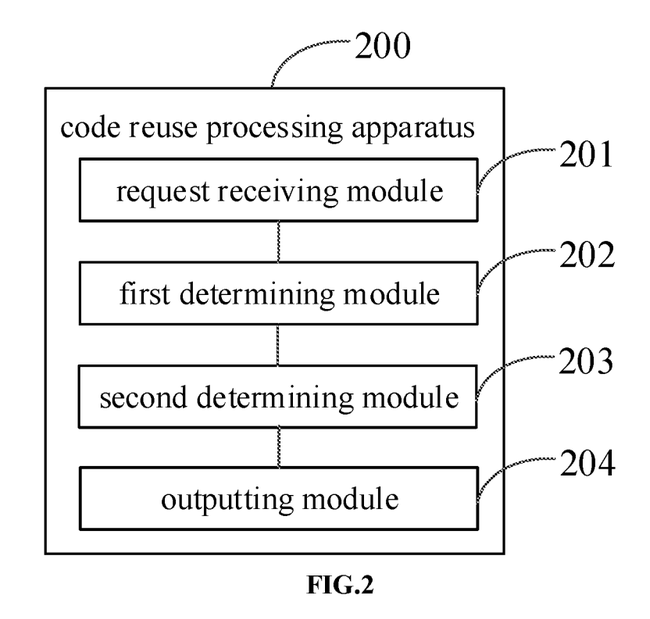
FIG. 2 is a first schematic view according to a second embodiment of the present disclosure.

Referring to FIG. 2, a code reuse processing apparatus is provided in an embodiment of the present disclosure, which is applied to an electronic device, and as shown in FIG. 2, a code reuse processing apparatus 200 includes:

a request receiving module 201, configured to receive a target request sent by a client of a target unit;

a first determining module 202, configured to determine, in response to the target request, a first code line quantity and a reuse code base of the target unit, where the first code line quantity is a code line quantity per capita submitted within a target unit time, the reuse code base is a code base used by a first code base in a dependency manner, and the first code base is a code base except the reuse code base;

a second determining module 203, configured to determine reference information, based on the first code line quantity, a code line quantity of the reuse code base and a preset reuse proportion, where the reference information is configured to indicate an amount of labor capable of being saved for the target unit when the target unit performs a code reuse within a target duration; and an outputting module 204, configured to output the reference information to the client.

Figure 3:
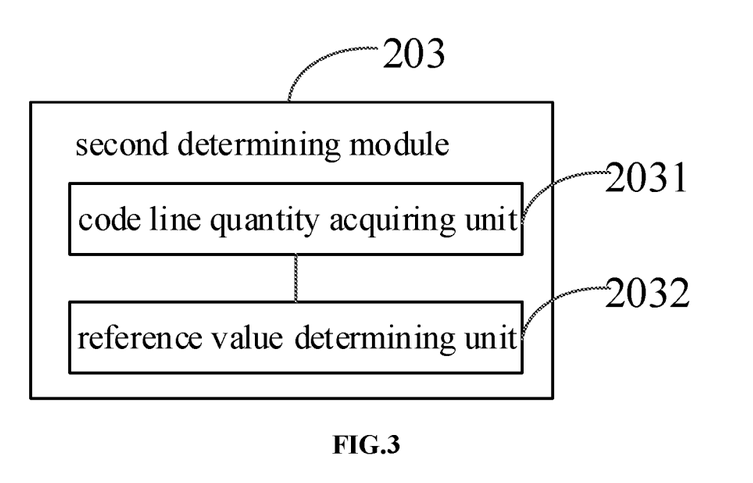
FIG. 3 is a second schematic view according to the second embodiment of the present disclosure.

Optionally, as shown in FIG. 3, the second determining module 203 includes:

a code line quantity acquiring unit 2031, configured to acquire a maximal code line quantity and an actual code line quantity of the reuse code base, where the maximal code line quantity is determined based on the first code line quantity, a quantity of people submitting codes and a quantity of code submitting times;

a reference value determining unit 2032, configured to determine the reference information based on the first code line quantity, the maximal code line quantity, the actual code line quantity and the preset reuse proportion.

Optionally, the reference value determining unit 2032 is further configured to:

determine the reference information based on the first code line quantity, the maximal code line quantity and the preset reuse proportion, in a case that the actual code line quantity is greater than or equal to the maximal code line quantity.

Optionally, the reference value determining unit 2032 is further configured to:

determine the reference information based on the first code line quantity, the actual code line quantity and the preset reuse proportion, in a case that the actual code line quantity is less than the maximal code line quantity.

Optionally, in the case that a number of times of submitting codes to the reuse code base by a target person within the target unit time is plural, the number of times of submitting codes by the target person is one.

Figure 4:
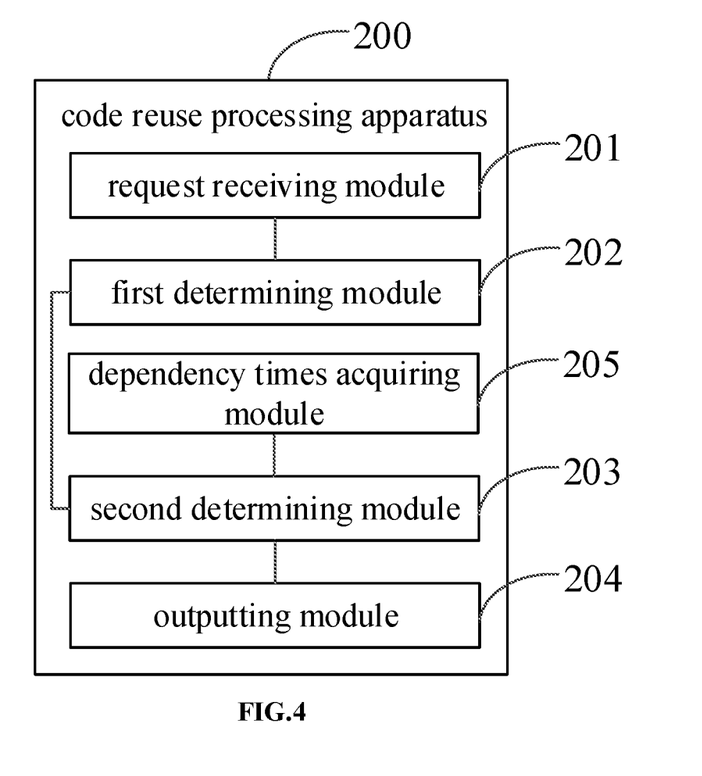
FIG. 4 is a third schematic view according to the second embodiment of the present disclosure.

Optionally, as shown in FIG. 4, the apparatus 200 further includes:

a dependency times acquiring module 205, configured to acquire a number of times of using the reuse code base in a dependency manner;

the second determining module 203 is further configured to:

determine the reference information, based on the first code line quantity, the code line quantity of the reuse code base, the number of times of using the reuse code base in a dependency manner and the preset reuse proportion.

Optionally, a number of times of using the reuse code base by the first code base in a dependency manner is greater than or equal to a preset number of times.

It should be noted that, the code reuse processing apparatus 200 can implement each process implemented by the electronic device in the embodiment of the method in FIG. 1 of the present disclosure, and achieve the same beneficial effects, and is not described herein again to avoid repetition.

According to an embodiment of the present disclosure, an electronic device and a readable storage medium are further provided.

Figure 5:
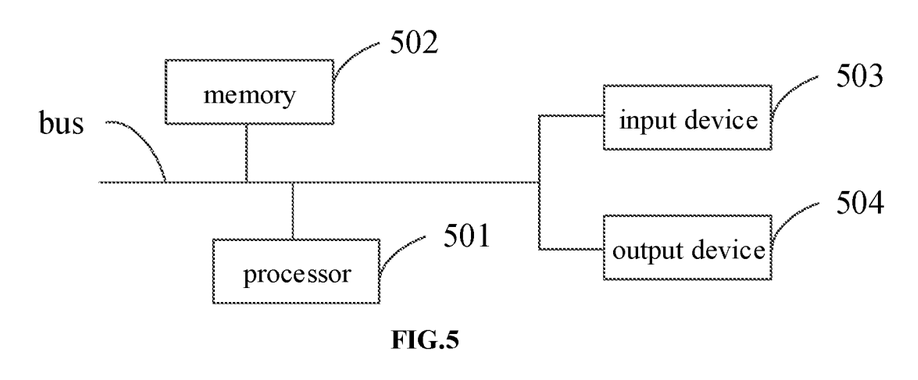
FIG. 5 is a block diagram of an electronic device for implementing a code reuse processing method according to an embodiment of the present disclosure.

FIG. 5 is a block diagram of an electronic device for implementing a code reuse processing method according to an embodiment of the present disclosure. Electronic devices are intended to represent various forms of digital computers, such as laptops, desktops, workstations, personal digital assistants, servers, blade servers, mainframes, and other appropriate computers. Electronic devices may also represent various forms of mobile devices, such as personal digital processors, cellular telephones, smart phones, wearable devices, and other similar computing devices. The components shown herein, their connections and relationships, and their functions, are meant to be exemplary only, and are not meant to limit implementations of the applications described and/or claimed herein.

As shown in FIG. 5, the electronic apparatus includes: one or more processors 501, memory 502, and interfaces for connecting the various components, including high-speed interfaces and low-speed interfaces. The various components are interconnected using different buses and may be mounted on a common motherboard or in other manners as desired. The processor may process instructions for execution within the electronic device, including instructions stored in or on the memory to display graphical information of a graphical user interface (GUI) on an external input/output apparatus (such as a display device coupled to the interface). In other embodiments, multiple processors and/or multiple buses may be used, along with multiple memories and multiple memories, if desired. Also, multiple electronic devices may be connected, with each device providing some of the necessary operations (e.g., as an array of servers, a group of blade servers, or a multi-processor system). FIG. 5 illustrates an example of a processor 501.

Memory 502 is a non-transitory computer readable storage medium as provided herein. Wherein the memory stores instructions executable by at least one processor to cause the at least one processor to perform the code reuse processing method provided herein. The non-transitory computer-readable storage medium of the present disclosure stores computer instructions for causing a computer to execute the code reuse processing method provided by the present disclosure.

The memory 502, which is a non-transitory computer-readable storage medium, may be used to store non-transitory software programs, non-transitory computer-executable programs, and modules, such as program instructions/modules corresponding to the code reuse processing method in the embodiment of the present disclosure (for example, the request receiving module 201, the first determining module 202, the second determining module 203, and the outputting module 204 shown in FIG. 2). The processor 501 executes various functional applications of the server and data processing, i.e., a processing method of implementing code reuse in the above method embodiments, by running non-transitory software programs, instructions, and modules stored in the memory 502.

The memory 502 may include a storage program area and a storage data area, wherein the storage program area may store an operating system, an application program required for at least one function; the storage data area may store data created from use of the electronic device based on detection of echo delay, and the like. Further, the memory 502 may include high speed random access memory, and may also include non-transitory memory, such as at least one magnetic disk storage device, flash memory device, or other non-transitory solid state storage device. In some embodiments, the memory 502 may optionally include memory remotely located from the processor 501, and such remote memory may be connected over a network to the electronic device for echo latency detection. Examples of such networks include, but are not limited to, the internet, intranets, local area networks, mobile communication networks, and combinations thereof.

The electronic device of the code reuse processing method may further include: an input device 503 and an output device 504. The processor 501, the memory 502, the input device 503 and the output device 504 may be connected by a bus or other means, and FIG. 5 illustrates the connection by a bus as an example.

The input device 503 may receive input numeric or character information, and generate key signal inputs related to user settings and function control of the electronic apparatus related to detection of the echo time delay, such as a touch screen, a keypad, a mouse, a track pad, a touch pad, a pointing stick, one or more mouse buttons, a track ball, a joystick, and the like. The output devices 504 may include a display device, auxiliary lighting devices (e.g., LEDs), and tactile feedback devices (e.g., vibrating motors), among others. The display device may include, but is not limited to, a Liquid Crystal Display (LCD), a Light Emitting Diode (LED) display, and a plasma display. In some implementations, the display device can be a touch screen.

Various implementations of the systems and techniques described here can be realized in digital electronic circuitry, integrated circuitry, application specific ASICs (application specific integrated circuits), computer hardware, firmware, software, and/or combinations thereof. These various embodiments may include: implemented in one or more computer programs that are executable and/or interpretable on a programmable system including at least one programmable processor, which may be special or general purpose, receiving data and instructions from, and transmitting data and instructions to, a storage system, at least one input device, and at least one output device.

These computer programs (also known as programs, software applications, or code) include machine instructions for a programmable processor, and may be implemented using high-level procedural and/or object-oriented programming languages, and/or assembly/machine languages. As used herein, the terms "machine-readable medium" and "computer-readable medium" refer to any computer program product, apparatus, and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having: a display device (e.g., a CRT (cathode ray tube) or LCD (liquid crystal display) monitor) for displaying information to a user; and a keyboard and a pointing device (e.g., a mouse or a trackball) by which a user may provide input to the computer. Other kinds of devices may also be used to provide for interaction with a user; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a user computer having a graphical user interface or a web browser through which a user can interact with an implementation of the systems and techniques described here), or any combination of such back-end, middleware, or front-end components. The components of the system can be interconnected by any form or medium of digital data communication (e.g., a communication network). Examples of communication networks include: local Area Networks (LANs), Wide Area Networks (WANs), and the Internet.

The computer system may include clients and servers. A client and server are generally remote from each other and typically interact through a communication network. The relationship of client and server arises by virtue of computer programs running on the respective computers and having a client-server relationship to each other.

In the present disclosure, a dial picture is obtained; at least one text center line in the dial picture and a surrounding frame corresponding to each text center line are detected; text content of each line of text in the dial picture is identified based on the at least one text centerline and the bounding box corresponding to each text centerline. Therefore, the electronic device can accurately and quickly identify the text content in the dial plate picture, so that the identification accuracy and efficiency of the metering content of the instrument panel are improved.

It should be understood that various forms of the flows shown above, reordering, adding or deleting steps, may be used. For example, the steps described in the present disclosure may be executed in parallel, sequentially, or in different orders, and are not limited herein as long as the desired results of the technical solutions disclosed in the present disclosure can be achieved.

The above-described embodiments are not intended to limit the scope of the present disclosure. It should be understood by those skilled in the art that various modifications, combinations, sub-combinations and substitutions may be made, depending on design requirements and other factors. Any modification, equivalent replacement, and improvement made within the principle of the present disclosure shall be included in the scope of the present disclosure.

What is claimed is:

1. An information sending method, applied to an electronic device and comprising:
   receiving a target request sent by a client of a target unit;
   in response to the target request, determining a first code line quantity and a reuse code base of the target unit, wherein the first code line quantity is a code line quantity per capita submitted within a target unit time, the reuse code base is a code base reused by a first code base, and the first code base is a code base except the reuse code base;
   determining reference information, based on the first code line quantity, a code line quantity of the reuse code base and a preset reuse proportion, wherein the reference information is configured to indicate an amount of labor capable of being saved for the target unit when the target unit performs a code reuse within a target duration; and
   outputting the reference information to the client.

2. The method according to claim 1, wherein the determining the reference information based on the first code line quantity, the code line quantity of the reuse code base and the preset reuse proportion comprises:
   acquiring a maximal code line quantity and an actual code line quantity of the reuse code base, wherein the maximal code line quantity is determined based on the first code line quantity, a quantity of people submitting codes and a quantity of code submitting times; and
   determining the reference information based on the first code line quantity, the maximal code line quantity, the actual code line quantity and the preset reuse proportion.

3. The method according to claim 2, wherein the determining the reference information based on the first code line quantity, the maximal code line quantity, the actual code line quantity and the preset reuse proportion comprises:
   determining the reference information based on the first code line quantity, the maximal code line quantity and the preset reuse proportion, in a case that the actual code line quantity is greater than or equal to the maximal code line quantity.

4. The method according to claim 2, wherein the determining the reference information based on the first code line quantity, the maximal code line quantity, the actual code line quantity and the preset reuse proportion comprises:
   determining the reference information based on the first code line quantity, the actual code line quantity and the preset reuse proportion, in a case that the actual code line quantity is less than the maximal code line quantity.

5. The method according to claim 2, wherein in a case that a number of times of submitting codes to the reuse code base by a target person within the target unit time is plural, the number of times of submitting codes by the target person is one.

6. The method according to claim 1, wherein prior to the determining the reference information based on the first code line quantity and the code line quantity of the reuse code base, the method further comprises:
   acquiring a number of times of reusing the reuse code base;
   the determining the reference information based on the first code line quantity, the code line quantity of the reuse code base and the preset reuse proportion comprises:
   determining the reference information, based on the first code line quantity, the code line quantity of the reuse code base, the number of times of reusing the reuse code base and the preset reuse proportion.

7. The method according to claim 1, wherein a number of times of reusing the reuse code base by the first code base is greater than or equal to a preset number of times.

8. A code reuse processing apparatus, applied to an electronic device and comprising:
   at least one processor; and
   a memory communicatively coupled to the at least one processor; wherein the memory stores instructions executable by the at least one processor, and the instructions are executed by the at least one processor to enable the at least one processor to:
   receive a target request sent by a client of a target unit;
   determine, in response to the target request, a first code line quantity and a reuse code base of the target unit, wherein the first code line quantity is a code line quantity per capita submitted within a target unit time, the reuse code base is a code base reused by a first code base, and the first code base is a code base except the reuse code base;
   determine reference information, based on the first code line quantity, a code line quantity of the reuse code base and a preset reuse proportion, wherein the reference information is configured to indicate an amount of labor capable of being saved for the target unit when the target unit performs a code reuse within a target duration; and
   output the reference information to the client.

9. The apparatus according to claim 8, wherein the instructions are executed by the at least one processor to enable the at least one processor to:
   acquire a maximal code line quantity and an actual code line quantity of the reuse code base, wherein the maximal code line quantity is determined based on the first code line quantity, a quantity of people submitting codes and a quantity of code submitting times; and
   determine the reference information based on the first code line quantity, the maximal code line quantity, the actual code line quantity and the preset reuse proportion.

10. The apparatus according to claim 9, wherein the instructions are executed by the at least one processor to enable the at least one processor to:
   determine the reference information based on the first code line quantity, the maximal code line quantity and the preset reuse proportion, in a case that the actual code line quantity is greater than or equal to the maximal code line quantity.

11. The apparatus according to claim 9, wherein the instructions are executed by the at least one processor to enable the at least one processor to:
   determine the reference information based on the first code line quantity, the actual code line quantity and the preset reuse proportion, in a case that the actual code line quantity is less than the maximal code line quantity.

12. The apparatus according to claim 9, wherein in a case that a number of times of submitting codes to the reuse code base by a target person within the target unit time is plural, the number of times of submitting codes by the target person is one.

13. The apparatus according to claim 8, wherein the instructions are executed by the at least one processor to enable the at least one processor to:
   acquire a number of times of reusing the reuse code base;
   the instructions are executed by the at least one processor to enable the at least one processor to:
   determine the reference information, based on the first code line quantity, the code line quantity of the reuse code base, the number of times of reusing the reuse code base and the preset reuse proportion.

14. The apparatus according to claim 8, wherein a number of times of reusing the reuse code base by the first code base is greater than or equal to a preset number of times.

* * * * *